US012643737B2

(12) United States Patent
Schad et al.

(10) Patent No.: US 12,643,737 B2
(45) Date of Patent: Jun. 2, 2026

(54) SYSTEMS AND METHODS FOR DETECTING MISSING REFUSE CANS

(71) Applicant: Oshkosh Corporation, Oshkosh, WI (US)

(72) Inventors: Vince Schad, Oshkosh, WI (US); Andy Cornelius, Oshkosh, WI (US); Nick Weykamp, Oshkosh, WI (US); Quincy Wittman, Oshkosh, WI (US); Jerrod Kappers, Oshkosh, WI (US); Brendan Chan, Oshkosh, WI (US); Eric Olson, Oshkosh, WI (US); Zhenyi Wei, Oshkosh, WI (US); Alec Ehlke, Oshkosh, WI (US); Jeff Meyer, Oshkosh, WI (US); Umang Patel, Oshkosh, WI (US); Austin Mahoney, Oshkosh, WI (US); Thomas Vale, Oshkosh, WI (US); Johnny Bui, Oshkosh, WI (US); Nagabhushana Sharma Gurumurthy, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/923,401

(22) Filed: Oct. 22, 2024

(65) Prior Publication Data

US 2025/0136364 A1 May 1, 2025

Related U.S. Application Data

(60) Provisional application No. 63/593,656, filed on Oct. 27, 2023.

(51) Int. Cl.
*B65F 1/00* (2006.01)
*B65F 1/14* (2006.01)

(52) U.S. Cl.
CPC .......... *B65F 1/14* (2013.01); *B65F 2210/128* (2013.01); *B65F 2210/138* (2013.01); *B65F 2210/168* (2013.01)

(58) Field of Classification Search
CPC ................. B65F 1/14; B65F 2210/128; B65F 2210/138; B65F 2210/168; B65F 2003/0263; B65F 3/02
See application file for complete search history.

(56) References Cited

U.S. PATENT DOCUMENTS

2001/0005479 A1 6/2001 Young et al.
2007/0086270 A1 4/2007 Harris et al.
2014/0110190 A1 4/2014 Sollers et al.
(Continued)

*Primary Examiner* — Tuyen K Vo
(74) *Attorney, Agent, or Firm* — Foley & Lardner LLP

(57) ABSTRACT

1. A system for detecting a refuse can including at least one sensor and one or more processing circuits communicably coupled to the sensor. The one or more processing circuits are configured to capture, from the at least one sensor, data regarding a pickup location associated with a refuse can, determine, based on the data, if the refuse can is present at the pickup location, upon determining that the refuse can is absent from the pickup location, generate an indication that the refuse can is absent from the pickup location, and upon determining that the refuse can is present at the pickup location, generate a command to initiate a refuse collection operation.

20 Claims, 10 Drawing Sheets

(56) References Cited

U.S. PATENT DOCUMENTS

2014/0231733 A1 8/2014 Hoffman et al.
2017/0361491 A1 12/2017 Datema et al.
2019/0121353 A1 4/2019 Datema et al.
2019/0195705 A1 6/2019 Messenger et al.
2019/0325220 A1 10/2019 Wildgrube et al.
2019/0344475 A1 11/2019 Datema et al.
2020/0078986 A1 3/2020 Clifton et al.
2020/0230841 A1 7/2020 Datema et al.
2020/0230842 A1 7/2020 Datema et al.
2020/0265656 A1 8/2020 Koga et al.
2020/0346657 A1 11/2020 Clifton et al.
2020/0346858 A1 11/2020 Buege et al.
2020/0346859 A1 11/2020 Buege et al.
2020/0346860 A1 11/2020 Buege et al.
2020/0348681 A1* 11/2020 Clifton .................. G05D 1/689
2020/0398857 A1 12/2020 Clifton et al.
2020/0401807 A1 12/2020 Wildgrube et al.
2020/0402325 A1 12/2020 Koga et al.
2021/0124347 A1 4/2021 Datema et al.
2021/0162630 A1 6/2021 Clifton et al.
2021/0225095 A1 7/2021 Koga et al.
2021/0229320 A1 7/2021 Datema et al.
2021/0271884 A1 9/2021 Wildgrube et al.
2021/0292086 A1 9/2021 Mahan et al.
2021/0316740 A1 10/2021 Clifton et al.
2021/0316741 A1 10/2021 Clifton et al.
2021/0323763 A1 10/2021 Koga et al.
2021/0323764 A1 10/2021 Koga et al.
2021/0323765 A1 10/2021 Koga et al.
2021/0324880 A1 10/2021 Wente et al.
2021/0325529 A1 10/2021 Koga et al.
2021/0325911 A1 10/2021 Koga et al.
2021/0326550 A1 10/2021 Kappers et al.
2021/0327164 A1 10/2021 Koga et al.
2021/0327170 A1 10/2021 Rocholl et al.
2021/0327237 A1 10/2021 Rocholl et al.
2021/0339648 A1 11/2021 Koga et al.
2021/0345062 A1 11/2021 Koga et al.
2021/0373560 A1 12/2021 Koga et al.
2021/0394394 A1 12/2021 Datema et al.
2021/0407222 A1 12/2021 Koga et al.
2022/0033181 A1 2/2022 Koga et al.
2022/0096884 A1 3/2022 Koga et al.
2022/0097527 A1 3/2022 Koga et al.
2022/0097555 A1 3/2022 Koga et al.
2022/0097556 A1 3/2022 Koga et al.
2022/0097633 A1 3/2022 Koga et al.
2022/0097961 A1 3/2022 Koga et al.
2022/0097962 A1 3/2022 Koga et al.
2022/0097963 A1 3/2022 Koga et al.
2022/0097964 A1 3/2022 Koga et al.
2022/0099723 A1 3/2022 Koga et al.
2022/0106114 A1 4/2022 Buege et al.
2022/0106115 A1 4/2022 Buege et al.
2022/0156474 A1 5/2022 Kappers et al.
2022/0161854 A1 5/2022 Mortenson et al.
2022/0161997 A1 5/2022 Mortenson et al.
2022/0185582 A1 6/2022 Koga et al.
2022/0219896 A1 7/2022 Gary et al.
2022/0258965 A1 8/2022 Kappers et al.
2022/0258967 A1 8/2022 Kappers et al.
2022/0332014 A1 10/2022 Datema et al.
2022/0380123 A1 12/2022 Buege et al.
2022/0388198 A1 12/2022 Datema et al.
2022/0415103 A1 12/2022 Rocholl et al.
2023/0002152 A1 1/2023 Koga et al.
2023/0023747 A1 1/2023 Clifton et al.
2023/0042649 A1 2/2023 Koga et al.
2023/0053238 A1 2/2023 Koga et al.
2023/0089417 A1 3/2023 Koga et al.
2023/0094582 A1 3/2023 Wildgrube et al.
2023/0116344 A1 4/2023 Datema et al.
2023/0117427 A1 4/2023 Turner et al.
2023/0120042 A1 4/2023 Turner et al.
2023/0125077 A1 4/2023 Gary et al.
2023/0127552 A1 4/2023 Rocholl et al.
2023/0145238 A1 5/2023 Clifton et al.
2023/0150763 A1 5/2023 Haberlein et al.
2023/0184934 A1 6/2023 Koga et al.
2023/0202340 A1 6/2023 Koga et al.
2023/0226719 A1 7/2023 Datema et al.
2023/0264701 A1 8/2023 Clifton et al.
2023/0265866 A1 8/2023 Wente et al.
2023/0271347 A1 8/2023 Datema et al.
2023/0273612 A1 8/2023 Datema et al.
2023/0286741 A1 9/2023 Buege et al.
2023/0287715 A1 9/2023 Kappers et al.
2023/0294915 A1 9/2023 Koga et al.
2023/0303321 A1 9/2023 Koga et al.
2023/0311666 A1 10/2023 Miller et al.
2023/0311768 A1 10/2023 Chan et al.
2023/0311916 A1 10/2023 Chan et al.
2023/0356674 A1 11/2023 Wei et al.
2023/0356935 A1 11/2023 Gary et al.
2023/0356938 A1 11/2023 Kappers et al.
2023/0356940 A1 11/2023 Codega et al.
2023/0356942 A1 11/2023 Koga et al.
2023/0382640 A1 11/2023 Buege et al.
2023/0386267 A1 11/2023 Koga et al.
2023/0415981 A1 12/2023 Miller et al.
2023/0415983 A1 12/2023 Chan et al.
2024/0001764 A1 1/2024 Koga et al.
2024/0017640 A1 1/2024 Koga et al.
2024/0025078 A1 1/2024 Datema et al.
2024/0062542 A1 2/2024 Wildgrube et al.
2024/0075815 A1 3/2024 Koga et al.
2024/0111290 A1 4/2024 Koga et al.
2024/0116705 A1 4/2024 Koga et al.
2024/0124224 A1 4/2024 Schimke et al.
2024/0124225 A1 4/2024 Schad et al.
2024/0131728 A1 4/2024 Buege et al.
2024/0132082 A1 4/2024 Clifton et al.
2024/0161552 A1 5/2024 Koga et al.
2024/0181677 A1 6/2024 Datema et al.
2024/0182044 A1 6/2024 Clifton et al.
2024/0190649 A1 6/2024 Mortenson et al.
2024/0217731 A1 7/2024 Schad et al.
2024/0217734 A1 7/2024 Wente et al.
2024/0217736 A1 7/2024 Schad et al.
2024/0217737 A1 7/2024 Schad et al.
2024/0218725 A1 7/2024 Schimke et al.
2024/0249570 A1 7/2024 Rocholl et al.
2024/0265794 A1 8/2024 Rocholl et al.
2024/0270488 A1 8/2024 Turner et al.
2024/0270489 A1 8/2024 Turner et al.
2024/0272634 A1 8/2024 Datema et al.
2024/0278837 A1 8/2024 Mortenson et al.
2024/0286831 A1 8/2024 Koga et al.
2024/0288873 A1 8/2024 Koga et al.
2024/0293958 A1 9/2024 Datema et al.
2024/0300734 A1 9/2024 Koga et al.
2024/0317048 A1 9/2024 Wallin et al.
2024/0320970 A1 9/2024 Wildgrube et al.
2024/0344533 A1 10/2024 Wente et al.
2024/0359908 A1 10/2024 Van Kampen et al.
2024/0359910 A1 10/2024 Wente et al.
2024/0359912 A1 10/2024 Weykamp et al.
2024/0362832 A1 10/2024 Van Kampen et al.
2024/0400301 A1 12/2024 Koga et al.
2024/0409160 A1 12/2024 Mortenson et al.
2024/0409309 A1 12/2024 Koga et al.
2025/0002249 A1 1/2025 Buege et al.
2025/0011079 A1 1/2025 Gary et al.

* cited by examiner

SYSTEMS AND METHODS FOR DETECTING MISSING REFUSE CANS

CROSS-REFERENCE TO RELATED PATENT APPLICATIONS

This application claims the benefit of and priority to U.S. Provisional Application No. 63/593,656, filed on Oct. 27, 2023, the entire disclosure of which is hereby incorporated by reference herein.

BACKGROUND

The present disclosure generally relates to the field of refuse vehicles. More specifically, the present disclosure relates to control systems for refuse vehicles.

SUMMARY

One embodiment of the present disclosure relates to a system for detecting a refuse can. The includes at least one sensor and one or more processing circuits communicably coupled to the sensor. The one or more processing circuits are configured to capture, from the at least one sensor, data regarding a pickup location associated with a refuse can, determine, based on the data, if the refuse can is present at the pickup location, upon determining that the refuse can is absent from the pickup location, generate an indication that the refuse can is absent from the pickup location, and upon determining that the refuse can is present at the pickup location, generate a command to initiate a refuse collection operation.

Another embodiment of the present disclosure relates to a refuse vehicle. The refuse vehicle includes a chassis coupled to a plurality of tractive elements, a body assembly supported by the chassis, the body assembly defining a refuse compartment configured to receive refuse therein, an actuator assembly configured to engage with a refuse can and to move the refuse can relative to the body assembly, a sensor coupled to at least one of the chassis, the body assembly, or the actuator assembly, and a control system configured to, capture, from the sensor, data regarding a pickup location associated with the refuse can, determine, based on the data, if the refuse can is present at the pickup location, upon determining that the refuse can is absent from the pickup location, generate an indication that the refuse can is absent from the pickup location, and upon determining that the refuse can is present at the pickup location, initiate, by the actuator assembly, a refuse collection operation.

Still another embodiment of the present disclosure relates to a method for detecting a refuse can. The method includes acquiring data of an area surrounding a refuse vehicle from at least one sensor coupled to the refuse vehicle, the area including a pickup location associated with a refuse can, determine, based on the data, if the refuse can is present at the pickup location, upon determining that the refuse can is absent from the pickup location, generate an indication that the refuse can is absent from the pickup location, and upon determining that the refuse can is present at the pickup location, initiate a refuse collection operation.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

Referring generally to the FIGURES, systems and methods for detecting a missing refuse can are shown, according to various embodiments. The refuse can detection system may include a controller configured to receive and process data from one or more sensors or image capturing devices coupled to a refuse vehicle. In a typical application, the refuse vehicle travels along a route stopping at pickup locations to collect refuse stored in refuse cans and placed in a pickup location by a customer to be collected by the refuse vehicle. The system may process image data, video data, and other sensor data gathered by the one or more sensors of image capturing devices to detect whether the refuse can is present or absent at any particular pickup location along the route. The system may record location data, by way of GPS coordinates or by way of capturing environmental location data from the image capturing devices (e.g., address number, street signs, road markings, etc.) that records a location of where (e.g., which address, which customer, etc.) the system detected a missing refuse can (e.g., by way of a determination from the system that no refuse can is present). The system is configured to transmit data associated with the location of where a missing refuse can was detected to surrounding refuse vehicles within the area, a user device, a service manager, and/or a network to be shared. The data may include a command commanding a Human Machine Interface (HMI) of a vehicle within the surrounding area to notify the driver of the location identified to have a missing refuse can so that a subsequent pickup may be performed, for example. The notification may instruct the driver to drive along a route past the location to detect whether the refuse can has been placed at the pickup location at a later period during the day, for example.

Refuse Vehicle

Front-Loading Configuration

Figure 1:
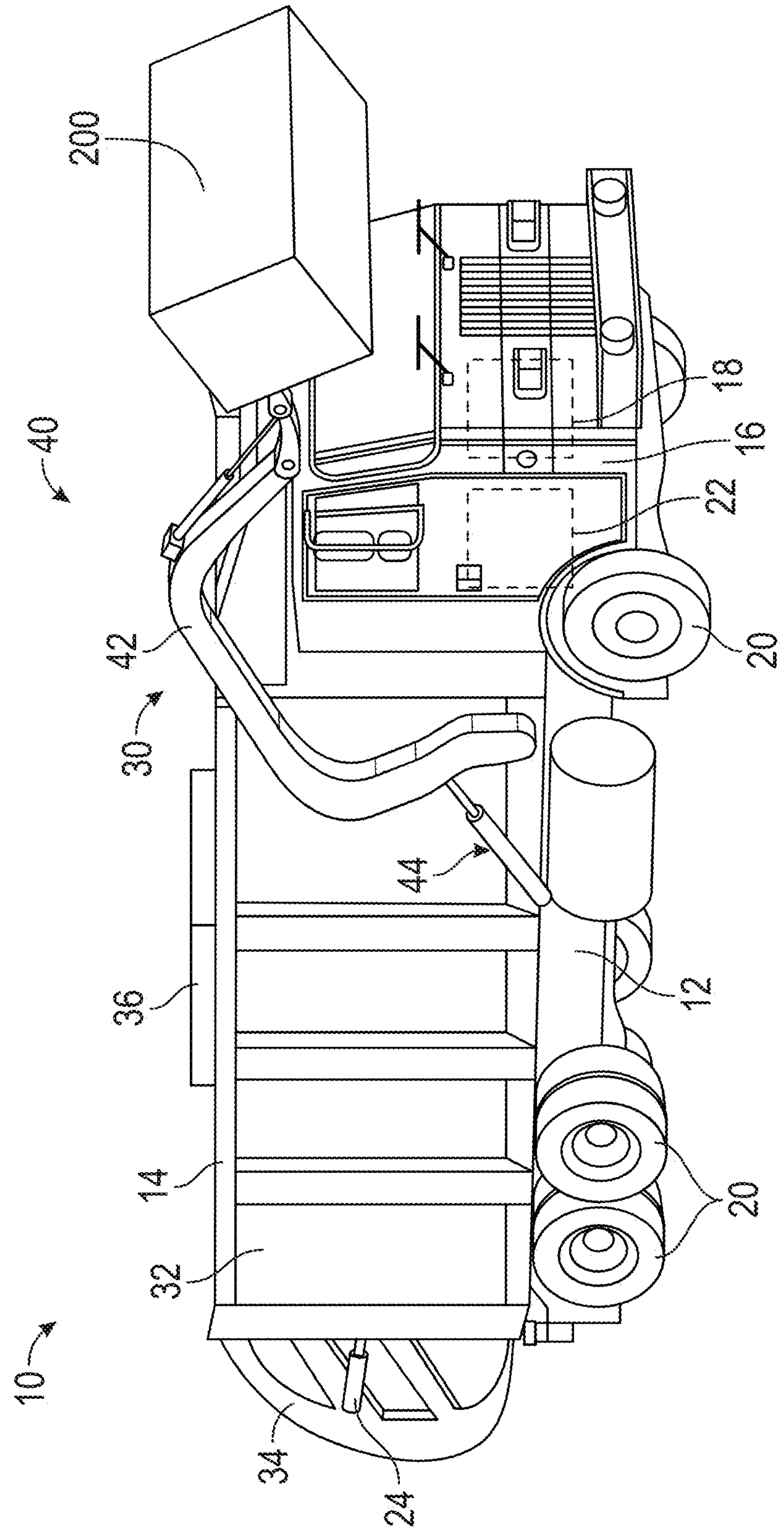
FIG. 1 is a perspective view of a front-loading refuse vehicle, according to an exemplary embodiment.

Referring to FIG. 1, a vehicle, shown as refuse vehicle 10 (e.g., a garbage truck, a waste collection truck, a sanitation truck, etc.), is shown that is configured to collect and store refuse along a collection route. In the embodiment of FIG. 1, the refuse vehicle 10 is configured as a front-loading refuse vehicle. The refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, hydraulic controls, a user interface, an acceleration pedal, a brake pedal, a clutch pedal, a gear selector, switches, buttons, dials, etc.). As shown in FIG. 1, the refuse vehicle 10 includes a prime mover, shown as engine 18, coupled to the frame 12 at a position beneath the cab 16. The engine 18 is configured to provide power to tractive elements, shown as tractive elements 20, and/or to other systems of the refuse vehicle 10 (e.g., a pneumatic system, a hydraulic system, etc.). The engine 18 may be configured to utilize one or more of a variety of fuels (e.g., gasoline, diesel, bio-diesel, ethanol, natural gas, etc.), according to various exemplary embodiments. The fuel may be stored in a tank 28 (e.g., a vessel, a container, a capsule, etc.) that is fluidly coupled with the engine 18 through one or more fuel lines.

According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from any of an on-board storage device (e.g., batteries, ultra-capacitors, etc.), from an on-board generator (e.g., an internal combustion engine, etc.), or from an external power source (e.g., overhead power lines, etc.) and provide power to the systems of the refuse vehicle 10. The engine 18 may transfer output torque to or drive the tractive elements 20 (e.g., wheels, wheel assemblies, etc.) of the refuse vehicle 10 through a transmission 22. The engine 18, the transmission 22, and one or more shafts, axles, gearboxes, etc., may define a driveline of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted. The refuse compartment 30 may provide temporary storage for refuse during transport to a waste disposal site and/or a recycling facility. In some embodiments, at least a portion of the body 14 and the refuse compartment 30 extend in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter transferred and/or compacted into the storage volume. According to an exemplary embodiment, the hopper volume is positioned forward of the cab 16 (e.g., refuse is loaded into a position of the refuse compartment 30 in front of the cab 16, a front-loading refuse vehicle, etc.). In other embodiments, the hopper volume is positioned between the storage volume and the cab 16 (e.g., refuse is loaded into a position of the refuse compartment 30 behind the cab 16 and stored in a position further toward the rear of the refuse compartment 30). In yet other embodiments, the storage volume is positioned between the hopper volume and the cab 16 (e.g., a rear-loading refuse vehicle, etc.).

The tailgate 34 may be hingedly or pivotally coupled with the body 14 at a rear end of the body 14 (e.g., opposite the cab 16). The tailgate 34 may be driven to rotate between an open position and a closed position by tailgate actuators 24. The refuse compartment 30 may be hingedly or pivotally coupled with the frame 12 such that the refuse compartment 30 can be driven to raise or lower while the tailgate 34 is open in order to dump contents of the refuse compartment 30 at a landfill. The refuse compartment 30 may include a packer assembly (e.g., a compaction apparatus) positioned therein that is configured to compact loose refuse.

Referring still to FIG. 1, the refuse vehicle 10 includes a first lift mechanism or system (e.g., a front-loading lift assembly, etc.), shown as lift assembly 40. The lift assembly 40 includes a pair of arms, shown as lift arms 42, coupled to at least one of the frame 12 or the body 14 on either side of the refuse vehicle 10 such that the lift arms 42 extend forward of the cab 16 (e.g., a front-loading refuse vehicle, etc.). The lift arms 42 may be rotatably coupled to frame 12 with a pivot (e.g., a lug, a shaft, etc.). The lift assembly 40 includes first actuators, shown as lift arm actuators 44 (e.g., hydraulic cylinders, etc.), coupled to the frame 12 and the lift arms 42. The lift arm actuators 44 are positioned such that extension and retraction thereof rotates the lift arms 42 about an axis extending through the pivot, according to an exemplary embodiment. Lift arms 42 may be removably coupled to a container, shown as refuse container 200 in FIG. 1. Lift arms 42 are configured to be driven to pivot by lift arm actuators 44 to lift and empty the refuse container 200 into the hopper volume for compaction and storage. The lift arms 42 may be coupled with a pair of forks or elongated members that are configured to removably couple with the refuse container 200 so that the refuse container 200 can be lifted and emptied. The refuse container 200 may be similar to the container attachment 200 as described in greater detail in U.S. application Ser. No. 17/558,183, filed Dec. 12, 2021, the entire disclosure of which is incorporated by reference herein.

Rear-Loading Configuration

Figure 2:
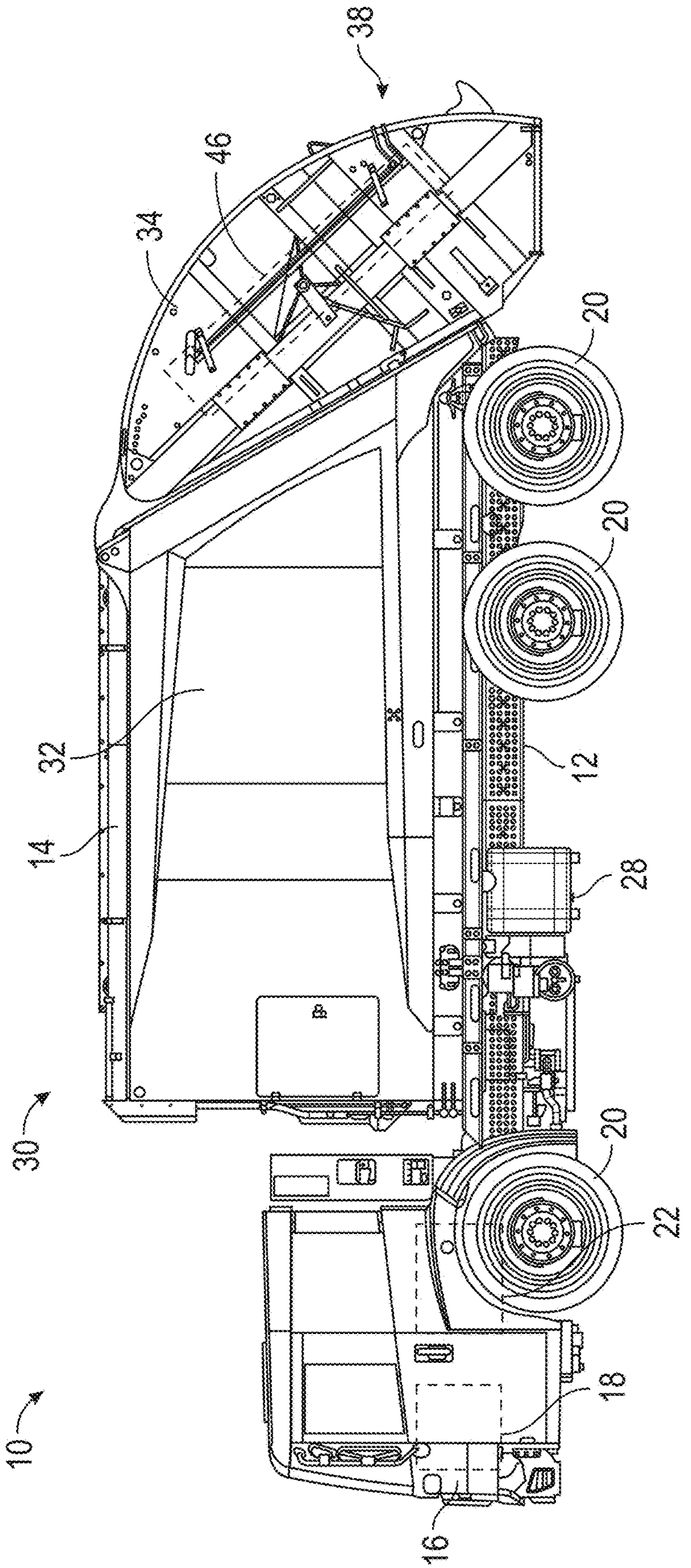
FIG. 2 is a side view of a rear-loading refuse vehicle, according to an exemplary embodiment.

As shown in FIG. 2, the refuse vehicle 10 may be configured as a rear-loading refuse vehicle, according to some embodiments. In the rear-loading embodiment of the refuse vehicle 10, the tailgate 34 defines an opening 38 through which loose refuse may be loaded into the refuse compartment 30. The tailgate 34 may also include a packer 46 (e.g., a packing assembly, a compaction apparatus, a claw, a hinged member, etc.) that is configured to draw refuse into the refuse compartment 30 for storage. Similar to the embodiment of the refuse vehicle 10 described in FIG.

1 above, the tailgate 34 may be hingedly coupled with the refuse compartment 30 such that the tailgate 34 can be opened or closed during a dumping operation.

Side-Loading Configuration

Figure 3:
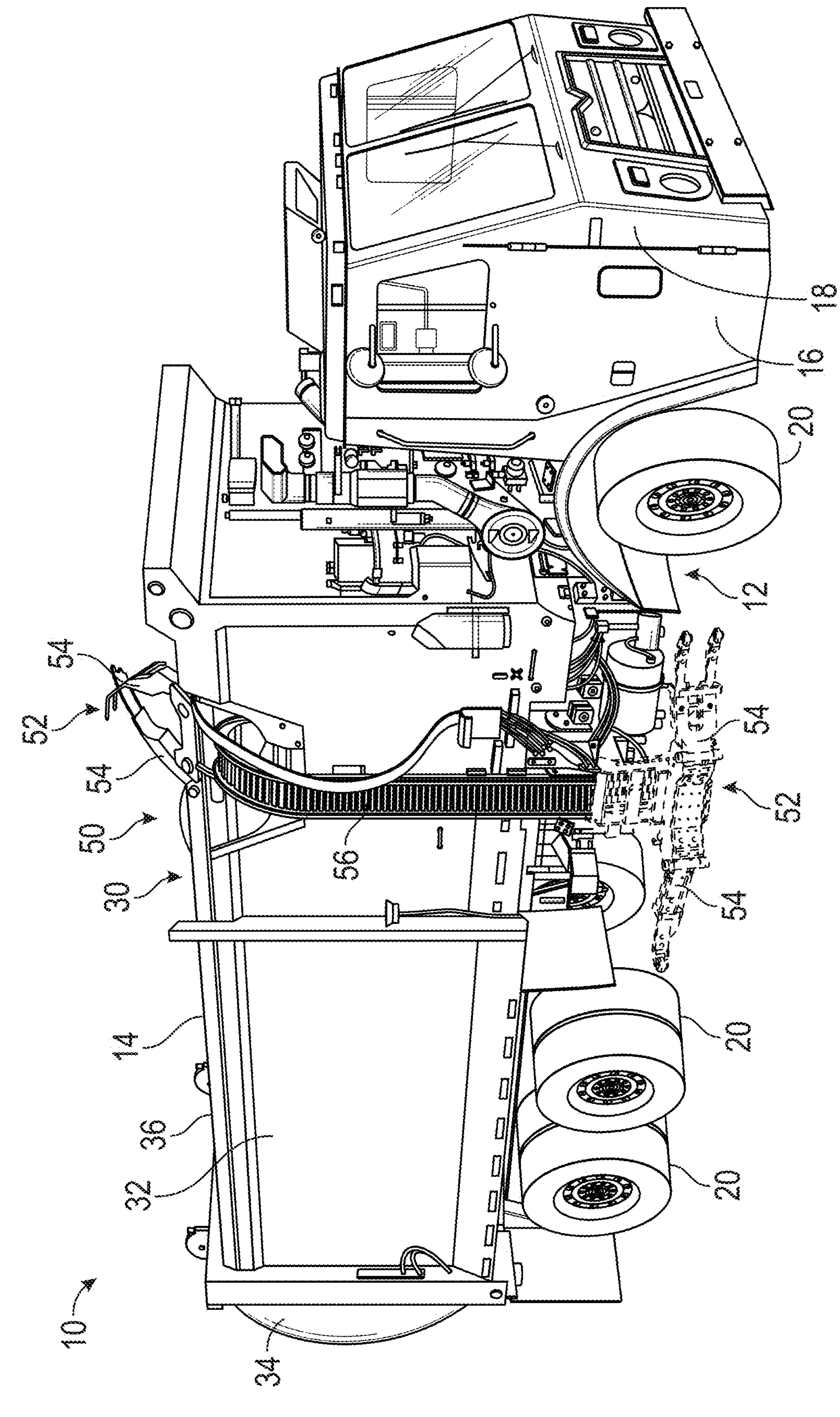
FIG. 3 is a perspective view of a side-loading refuse vehicle, according to an exemplary embodiment.

Referring to FIG. 3, the refuse vehicle 10 may be configured as a side-loading refuse vehicle (e.g., a zero radius side-loading refuse vehicle). The refuse vehicle 10 includes first lift mechanism or system, shown as lift assembly 50. Lift assembly 50 includes a grabber assembly, shown as grabber assembly 52, movably coupled to a track, shown as track 56, and configured to move along an entire length of track 56. According to the exemplary embodiment shown in FIG. 3, track 56 extends along substantially an entire height of body 14 and is configured to cause grabber assembly 52 to tilt near an upper height of body 14. In other embodiments, the track 56 extends along substantially an entire height of body 14 on a rear side of body 14. The refuse vehicle 10 can also include a reach system or assembly coupled with the body 14 or frame 12 of refuse vehicle 10 and lift assembly 50. The reach system can include telescoping members, a scissors stack, etc., or any other configuration that can extend or retract to provide additional reach of grabber assembly 52 for refuse collection.

Referring still to FIG. 3, grabber assembly 52 includes a pair of grabber arms shown as grabber arms 54. The grabber arms 54 are configured to rotate about an axis extending through a bushing. The grabber arms 54 are configured to releasably secure a refuse container to grabber assembly 52, according to an exemplary embodiment. The grabber arms 54 rotate about the axis extending through the bushing to transition between an engaged state (e.g., a fully grasped configuration, a fully grasped state, a partially grasped configuration, a partially grasped state) and a disengaged state (e.g., a fully open state or configuration, a fully released state/configuration, a partially open state or configuration, a partially released state/configuration). In the engaged state, the grabber arms 54 are rotated towards each other such that the refuse container is grasped therebetween. In the disengaged state, the grabber arms 54 rotate outwards such that the refuse container is not grasped therebetween. By transitioning between the engaged state and the disengaged state, the grabber assembly 52 releasably couples the refuse container with grabber assembly 52. The refuse vehicle 10 may pull up along-side the refuse container, such that the refuse container is positioned to be grasped by the grabber assembly 52 therebetween. The grabber assembly 52 may then transition into an engaged state to grasp the refuse container. After the refuse container has been securely grasped, the grabber assembly 52 may be transported along track 56 with the refuse container. When the grabber assembly 52 reaches the end of track 56, the grabber assembly 52 may tilt and empty the contents of the refuse container in refuse compartment 30. The tilting is facilitated by the path of the track 56. When the contents of the refuse container have been emptied into refuse compartment 30, the grabber assembly 52 may descend along the track 56, and return the refuse container to the ground. Once the refuse container has been placed on the ground, the grabber assembly 52 may transition into the disengaged state, releasing the refuse container.

Control System

Figure 4:
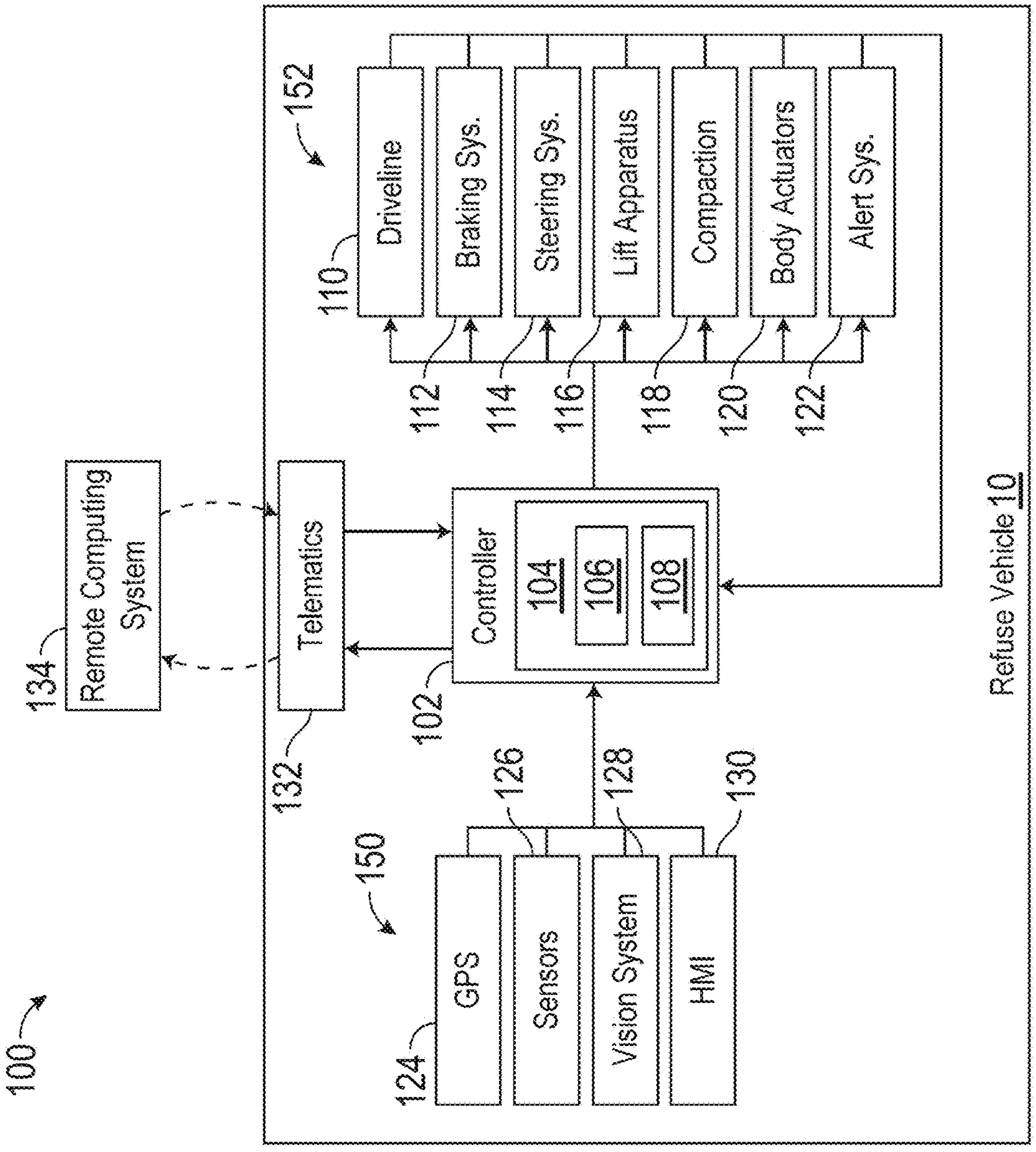
FIG. 4 is a block diagram of a control system for any of the refuse vehicles of FIGS. 1-3, according to an exemplary embodiment.

Referring to FIG. 4, the refuse vehicle 10 may include a control system 100 that is configured to facilitate autonomous or semi-autonomous operation of the refuse vehicle 10, or components thereof. The control system 100 includes a controller 102 that is positioned on the refuse vehicle 10, a remote computing system 134, a telematics unit 132, one or more input devices 150, and one or more controllable elements 152. The input devices 150 can include a Global Positioning System ("GPS") 124, multiple sensors 126, a vision system 128 (e.g., an awareness system), and a Human Machine Interface ("HMI") 130. The controllable elements 152 can include a driveline 110 of the refuse vehicle 10, a braking system 112 of the refuse vehicle 10, a steering system 114 of the refuse vehicle 10, a lift apparatus 116 (e.g., the lift assembly 40, the lift assembly 50, etc.), a compaction system 118 (e.g., a packer assembly, the packer 46, etc.), body actuators 120 (e.g., tailgate actuators 24, lift or dumping actuators, etc.), and/or an alert system 122.

The controller 102 includes processing circuitry 104 including a processor 106 and memory 108. Processing circuitry 104 can be communicably connected with a communications interface of controller 102 such that processing circuitry 104 and the various components thereof can send and receive data via the communications interface. Processor 106 can be implemented as a general purpose processor, an application specific integrated circuit (ASIC), one or more field programmable gate arrays (FPGAs), a group of processing components, or other suitable electronic processing components.

Memory 108 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 108 can be or include volatile memory or non-volatile memory. Memory 108 can include database components, object code components, script components, or any other type of information structure for supporting the various activities and information structures described in the present application. According to some embodiments, memory 108 is communicably connected to processor 106 via processing circuitry 104 and includes computer code for executing (e.g., by at least one of processing circuitry 104 or processor 106) one or more processes described herein.

The controller 102 is configured to receive inputs (e.g., measurements, detections, signals, sensor data, etc.) from the input devices 150, according to some embodiments. In particular, the controller 102 may receive a GPS location from the GPS system 124 (e.g., current latitude and longitude of the refuse vehicle 10). The controller 102 may receive sensor data (e.g., engine temperature, fuel levels, transmission control unit feedback, engine control unit feedback, speed of the refuse vehicle 10, etc.) from the sensors 126. The controller 102 may receive image data (e.g., real-time camera data) from the vision system 128 of an area of the refuse vehicle 10 (e.g., in front of the refuse vehicle 10, rearwards of the refuse vehicle 10, on a street-side or curb-side of the refuse vehicle 10, at the hopper of the refuse vehicle 10 to monitor refuse that is loaded, within the cab 16 of the refuse vehicle 10, etc.). The controller 102 may receive user inputs from the HMI 130 (e.g., button presses, requests to perform a lifting or loading operation, driving operations, steering operations, braking operations, etc.).

The controller 102 may be configured to provide control outputs (e.g., control decisions, control signals, etc.) to the driveline 110 (e.g., the engine 18, the transmission 22, the engine control unit, the transmission control unit, etc.) to operate the driveline 110 to transport the refuse vehicle 10. The controller 102 may also be configured to provide control outputs to the braking system 112 to activate and operate the braking system 112 to decelerate the refuse vehicle 10 (e.g., by activating a friction brake system, a regenerative braking system, etc.). The controller 102 may be configured to provide control outputs to the steering system 114 to operate the steering system 114 to rotate or turn at least two of the tractive elements 20 to steer the refuse vehicle 10. The controller 102 may also be configured to operate actuators or motors of the lift apparatus 116 (e.g., lift arm actuators 44) to perform a lifting operation (e.g., to grasp, lift, empty, and return a refuse container). The controller 102 may also be configured to operate the compaction system 118 to compact or pack refuse that is within the refuse compartment 30. The controller 102 may also be configured to operate the body actuators 120 to implement a dumping operation of refuse from the refuse compartment 30 (e.g., driving the refuse compartment 30 to rotate to dump refuse at a landfill). The controller 102 may also be configured to operate the alert system 122 (e.g., lights, speakers, display screens, etc.) to provide one or more aural or visual alerts to nearby individuals.

The controller 102 may also be configured to receive feedback from any of the driveline 110, the braking system 112, the steering system 114, the lift apparatus 116, the compaction system 118, the body actuators 120, or the alert system 122. The controller 102 may provide any of the feedback to the remote computing system 134 via the telematics unit 132. The telematics unit 132 may include any wireless transceiver, cellular dongle, communications radios, antennas, etc., to establish wireless communication with the remote computing system 134. The telematics unit 132 may facilitate communications with telematics units 132 of nearby refuse vehicles 10 to thereby establish a mesh network of refuse vehicles 10.

The controller 102 is configured to use any of the inputs from any of the GPS system 124, the sensors 126, the vision system 128, or the HMI 130 to generate controls for the driveline 110, the braking system 112, the steering system 114, the lift apparatus 116, the compaction system 118, the body actuators 120, or the alert system 122. In some embodiments, the controller 102 is configured to operate the driveline 110, the braking system 112, the steering system 114, the lift apparatus 116, the compaction system 118, the body actuators 120, and/or the alert system 122 to autonomously transport the refuse vehicle 10 along a route (e.g., self-driving), perform pickups or refuse collection operations autonomously, and transport to a landfill to empty contents of the refuse compartment 30. The controller 102 may receive one or more inputs from the remote computing system 134 such as route data, indications of pickup locations along the route, route updates, customer information, pickup types, etc. The controller 102 may use the inputs from the remote computing system 134 to autonomously transport the refuse vehicle 10 along the route and/or to perform the various operations along the route (e.g., picking up and emptying refuse containers, providing alerts to nearby individuals, limiting pickup operations until an individual has moved out of the way, etc.).

In some embodiments, the remote computing system 134 is configured to interact with (e.g., control, monitor, etc.) the refuse vehicle 10 through a virtual refuse truck as described in U.S. application Ser. No. 16/789,962, now U.S. Pat. No. 11,380,145, filed Feb. 13, 2020, the entire disclosure of which is incorporated by reference herein. The remote computing system 134 may perform any of the route planning techniques as described in greater detail in U.S. application Ser. No. 18/111,137, filed Feb. 17, 2023, the entire disclosure of which is incorporated by reference herein. The remote computing system 134 may implement any route planning techniques based on data received by the controller 102. In some embodiments, the controller 102 is configured to implement any of the cart alignment techniques as described in U.S. application Ser. No. 18/242,224, filed Sep. 5, 2023, the entire disclosure of which is incorporated by reference herein. The refuse vehicle 10 and the remote computing system 134 may also operate or implement geofences as described in greater detail in U.S. application Ser. No. 17/232,855, filed Apr. 16, 2021, the entire disclosure of which is incorporated by reference herein.

Figure 5:
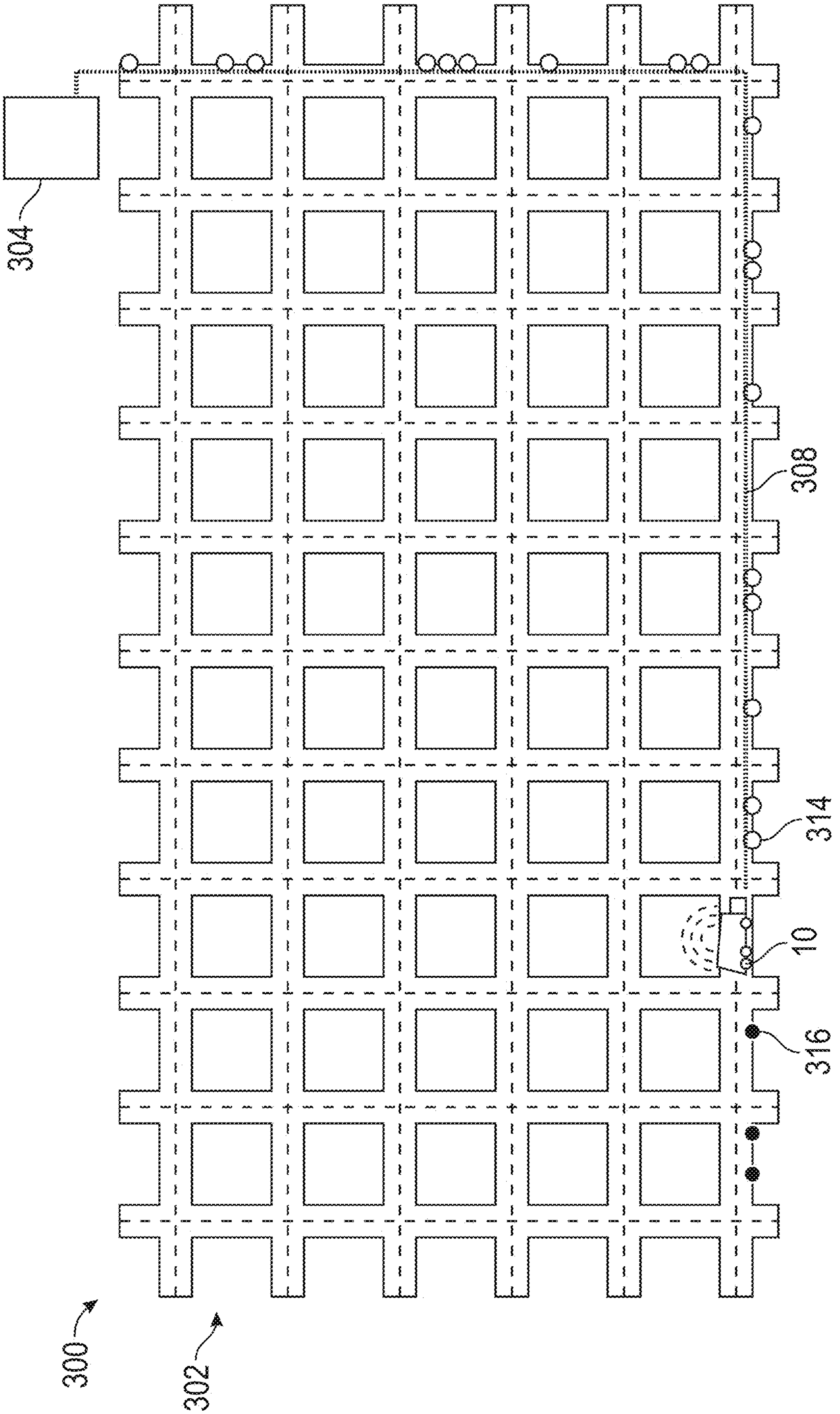
FIG. 5 is a diagram illustrating a collection route for autonomous transport and collection by any of the refuse vehicles of FIGS. 1-3, according to an exemplary embodiment.

Referring to FIG. 5, a diagram 300 illustrates a route 308 through a neighborhood 302 for the refuse vehicle 10. The route 308 includes future stops 314 along the route 308 to be completed, and past stops 316 that have already been completed. The route 308 may be defined and provided by the remote computing system 134. The remote computing system 134 may also define or determine the future stops 314 and the past stops 316 along the route 308 and provide data regarding the geographic location of the future stops 314 and the past stops 316 to the controller 102 of the refuse vehicle 10. The refuse vehicle 10 may use the route data and the stops data to autonomously transport along the route 308 and perform refuse collection at each stop. The route 308 may end at a landfill 304 (e.g., an end location, a transfer station, etc.) where the refuse vehicle 10 may autonomously empty collected refuse, transport to a refueling location if necessary, and begin a new route.

Detecting Missing Refuse Cans

Figure 6:
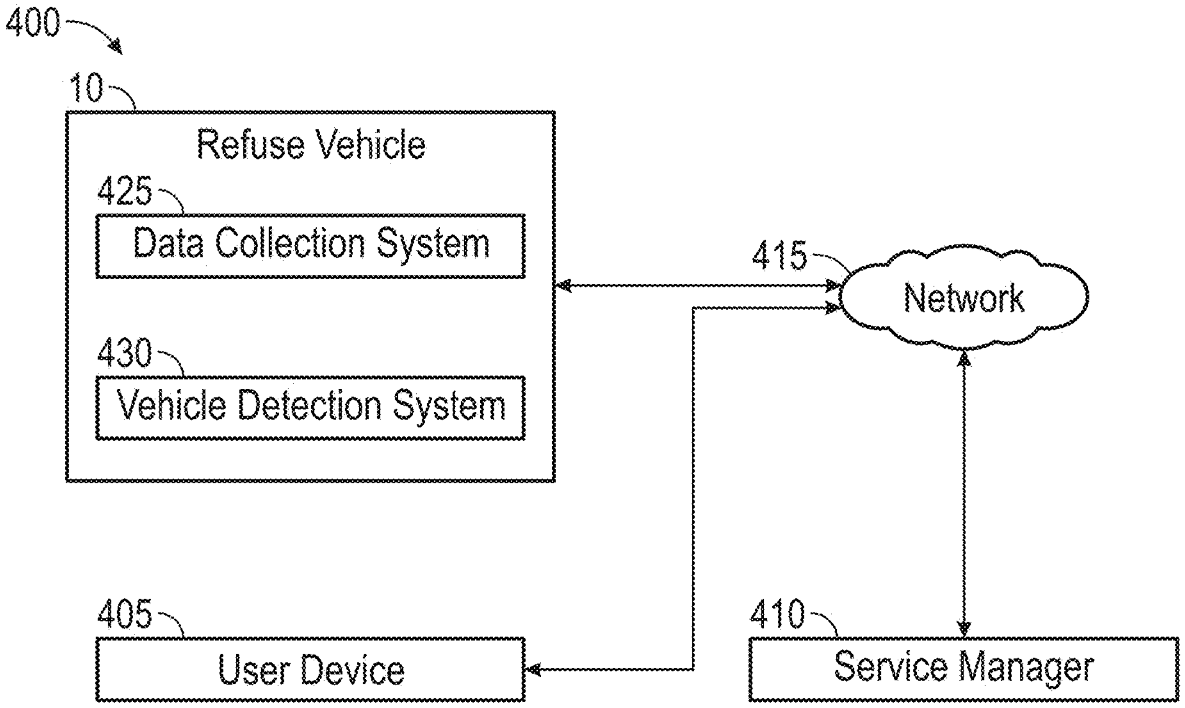
FIG. 6 is a block diagram of a refuse can detection system, according to an exemplary embodiment.

Referring to FIG. 6, an autonomous or partially autonomous refuse can detection system is shown as system 400, according to an exemplary embodiment. The system 400 is configured to capture data associated with a detection of a presence or an absence of objects such as refuse cans. The system 400 is further configured to communicate with other refuse vehicles 10, user devices, a service manager, and/or a network to transmit the captured data. The system 400 captures data from image and/or object systems (e.g., sensors 126, the vision system 128, etc.) to detect and/or track whether refuse cans have been placed in a pickup location at stops (e.g., future stops 314, past stops 316, present stops, etc.) along the route 308.

A refuse can (e.g., the first refuse can 505) may include a container for collecting or storing garbage, recycling, compost, and other refuse, so that the garbage, recycling, compost, or other refuse can be pooled with other waste, and transported for further processing. Generally speaking, waste may be classified as residential, commercial, industrial, etc. As used here, a "refuse can" may apply to any of these categories, as well as others. Depending on the category and usage, a waste receptacle may take the form of a garbage can, a dumpster, a recycling "blue box", a compost bin, etc. Further, refuse cans may be used for curb-side collection (e.g. at certain residential locations), as well as collection in other specified locations (e.g. in the case of dumpster collection).

A pickup location may include a location where a customer (e.g., resident, homeowner, building manager, etc.) places the refuse can such that the system 400 is capable of detecting (e.g., by way of the sensors 126 or the vision system 128) the presence and absence of the refuse can. By way of example, the pickup location may be any curb-side location along the route 308, a location on a driveway, walkway, yard, etc. at the stop, a designated pickup location designated by the refuse collection company, a location called in by the customer, or any other location near or along the route 308.

Referring to FIG. 6, the system 400 includes one or more refuse vehicles 10, one or more user devices (e.g., smartphones, tablets, laptop computers, desktop computers, pagers, smart speakers, AI assistants, etc.), shown as user devices 405, and a service manager (e.g., a cloud device, a cloud server, a cloud controller, etc.), shown as service manager 410.

The user devices 405 facilitate communication between a customer and the system 400. By way of example, a customer may provide a command, such as a request for pickup of refuse to the system 400, through the user device 405. By way of another example, the system 400 may communicate the current location of the refuse vehicle 10 to the customer through the user devices 405. By way of another example, the system 400 may transmit a notification to the user device 405 to alert the customer that their refuse was not collected by the refuse vehicle 10 because a refuse can was not detected at the pickup location (e.g., a location where the customer would place their refuse can to be picked up).

The service manager 410 may store data and manage the flow of information throughout the system 400. By way of example, the service manager 410 may track (e.g., retrieve and store) the current location of one or more refuse vehicles 10, the locations of each customer (e.g., future stops 314, past stops 316, etc.), indications that a refuse can was not detected at a stop, requests by the customer to pick up refuse, or other information.

The service manager 410 may control operation of the refuse vehicle 10 and/or the user device 405. By way of example, in response to receiving a request for refuse collection from a user device 405 of a customer, the service manager 410 may select a refuse vehicle 10 in the surrounding area (e.g., within 1 mile, within 5 miles, etc.) and provide an instruction to the selected refuse vehicle 10 (e.g., via the telematics unit 132 and the HMI 130) to navigate to the location of the customer. By way of another example, in response to receiving an indication that a refuse can was not detected at a stop (e.g., from the sensors 126, from the vision system 128, etc.), the service manager 410 may select a refuse vehicle 10 in the surrounding area (e.g., within 1 mile, within 5 miles, etc.) and provide an instruction to the selected refuse vehicle 10 (e.g., via the telematics unit 132 and the HMI 130) to navigate to the location of the customer. By way of another example, the service manager 410 may request for the refuse vehicle 10 to unload refuse from the refuse compartment 30 at the landfill 304.

The components of the system 400 (e.g., the refuse vehicle 10, the user device 405, and/or the service manager 410) may communicate with one another directly and/or across a network 415 (e.g., intranet, Internet, VPN, a cellular network, a satellite network, etc.). In some embodiments, the components of the system 400 communicate wirelessly. By way of example, the system 400 may utilize a cellular network, Bluetooth, near field communication (NFC), infrared communication, radio, or other types of wireless communication. In other embodiments, the system 400 utilizes wired communication.

Figure 7:
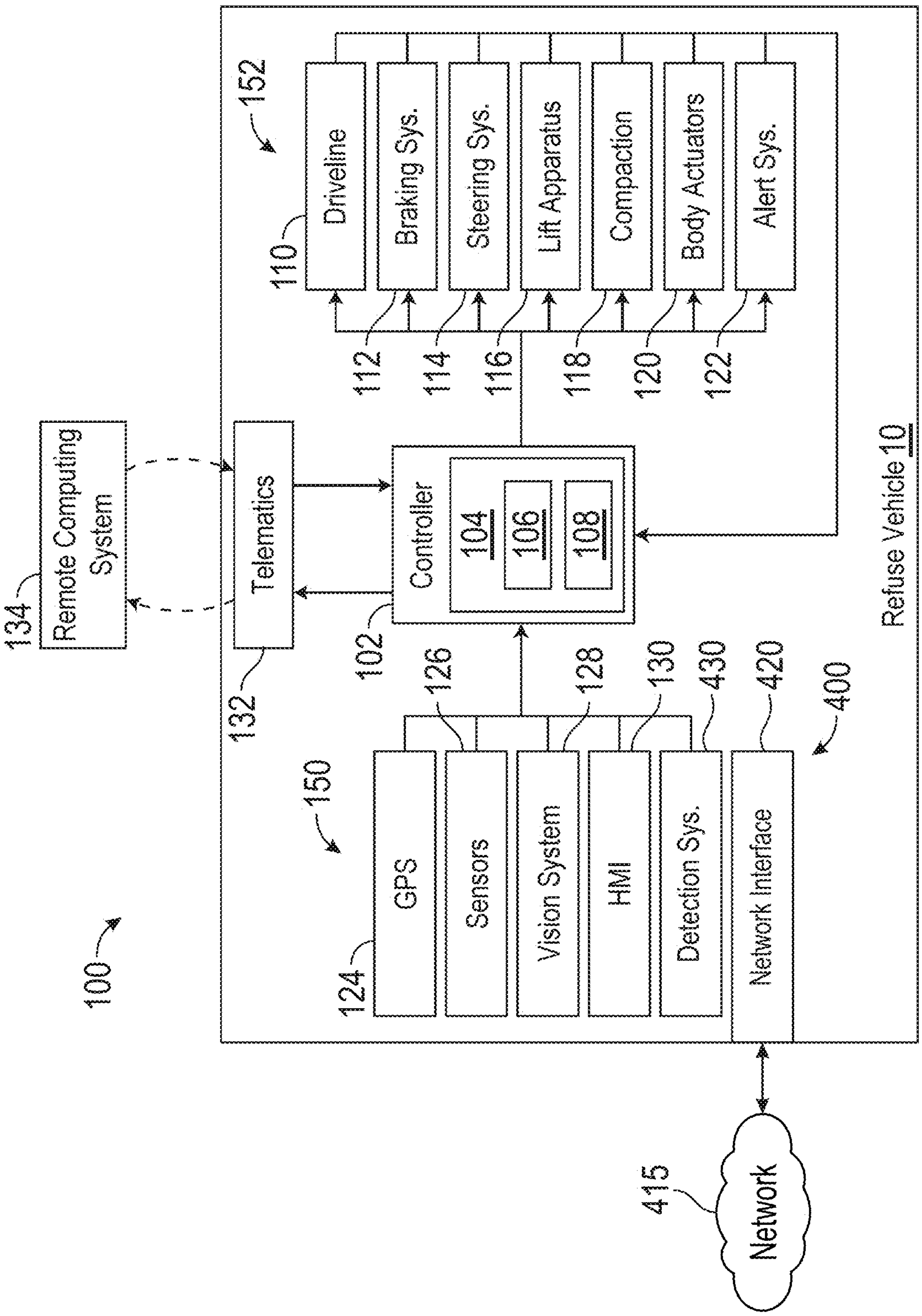
FIG. 7 is a block diagram of the refuse can detection system of FIG. 6, according to an exemplary embodiment.

Referring to FIG. 7, the network 415 may be communicably coupled to a network interface 420 included in the control system 100 such that the controller 102 is communicably coupled with the network 415 via the network interface 420, for transmitting and/or receiving data from/to network connected devices. The network 415 allows the controller 102 to communicate with other remote systems. By way of example, controller 102 may communicate with a server (i.e., a computer, a cloud server, service manager 410, etc.) to send and receive information regarding operations of the controller 102, the refuse vehicle 10, the user device 405, and/or the service manager 410.

The network interface 420 may include any type of wireless interface (e.g., antennas, transmitters, transceivers, etc.) for conducting data communications with the network 415. In some embodiments, the network interface 420 includes a cellular device configured to provide the controller 102 with Internet access by connecting the controller 102 to a cellular tower via a 2G network, a 3G network, an LTE network, a 5G network, etc. In some embodiments, the network interface 420 includes other types of wireless interfaces such as Bluetooth, WiFi, Zigbee, etc.

Referring to FIGS. 6 and 7, the refuse vehicle 10 includes a data collection system 425 and a vehicle detection system 430. The refuse vehicle 10 can interface with the user device 405, the service manager 410, and/or the network 415. The refuse vehicle 10 can provide information to the user device 405, the service manager 410, and/or the network 415. Similarly, the refuse vehicle 10 can receive information from the user device 405, the service manager 410, and/or the network 415. The information can include information associated with an indication of a presence or absence of the refuse can at one or more stops along the route 308 and/or other vehicle operations (e.g., emptying the refuse compartment 30, actuating the lift arms 42, and/or other vehicle or vehicle body operations). By way of example, the refuse vehicle 10 can provide to the service manager 410 a report that indicates which stops (e.g., past stops 316) did not have a refuse can placed in the pickup location (e.g., a refuse can was not detected at the stop).

In some embodiments, the data collection system 425 receives vehicle data from the vehicle detection system 430, the user device 405, the service manager 410, and/or the network 415. In some embodiments, the data received can include telematics data. In some embodiments, the data collection system 425, the user device 405, the service manager 410, and/or the network 415 interface using a controller area network (CAN). The data collection system 425 uses the vehicle data (e.g., data gathered from the sensors 126, data gathered form the vision system 128, etc.) to determine whether a refuse can was placed in the pickup location. By way of example, the data collection system 425 can receive a sensor data from the sensors 126 and image data from the vision system 128. In some embodiments, the data collection system 425 can assign a GPS location (e.g., received from the GPS system 124) to any one or more stops (e.g., past stops 316) where a refuse can was not present and/or detected at the stop.

In some embodiments, the data collection system 425 includes a communications interface (e.g., network interface 420), wherein the vehicle detection system 430 can interface with the data collection system 425 through the communications interface. The vehicle detection system 430 may be or include the one or more sensors 126 and/or the vision system 128.

As described herein, the vehicle detection system 430 (e.g., the sensors 126, the vision system 128, etc.) may include any type of device that is configured to capture data associated with the detection of objects such as refuse cans. In this regard, the vehicle detection system 430 may include any type of image and/or object sensors, such as one or more visible light cameras, full-spectrum cameras, LIDAR cameras/sensors, radar sensors, infrared cameras, image sensors (e.g., charged-coupled device (CCD), complementary metal oxide semiconductor (CMOS) sensors, etc.), or any other type of suitable object sensor or imaging device. Data captured by vehicle detection system 430 may include, for example, raw image data from one or more cameras (e.g., visible light cameras) of the vision system 128 and/or data from one or more sensors 126 (e.g., LIDAR, radar, etc.) that may be used to detect objects.

The sensors 126 and/or the vision system 128 may be disposed at any number of locations throughout and/or around refuse vehicle 10 for capturing image and/or object data from any direction with respect to refuse vehicle 10. By way of example, vehicle detection system 430 may include a plurality of visible light cameras and LIDAR cameras/sensors mounted on the forward and lateral sides of the refuse vehicle 10 for capturing data as the refuse vehicle 10 moves along the route 308. In some embodiments, one or more of the sensors 126 and/or the vision system 128 may be located on one or more components of the refuse vehicle 10, such as the panels 32, the tailgate 34, the lift arms 42, the grabber arms 54, etc.

The vehicle detection system 430 may generally receive and process data from the sensors 126 and/or the vision system 128 to detect the presence and absence of objects (e.g., refuse cans). The data received and processed by the vehicle detection system 430 may include any type of data as described above with respect to the vision system 128, including video from which images and/or other image data can be extracted. As described above, the data may also include data from one or more sensors 126 that may be utilized to detect the presence and absence of an object (e.g., a refuse can) and/or a location or position of the object. In some embodiments, the vehicle detection system 430 pre-processes the data from the sensors 126 and/or the vision system 128 before transmitting the data to the data collection system 425 for further processing.

The vehicle detection system 430 may process the received data to detect target objects, including refuse cans. It will be appreciated, however, that the vehicle detection system 430 may be configured to detect other objects based on other implementations of the controller 102. In this regard, the vehicle detection system 430 may provide means for the controller 102 to detect and track a plurality of refuse cans on the route 308 being traveled by the refuse vehicle 10. Similarly, the vehicle detection system 430 provides means for the controller 102 to detect and track the absence of a plurality of refuse cans on the route 308.

In some embodiments, the sensors 126 and/or the vision system 128 are configured to detect one or more characteristics associated with refuse can, and the vehicle detection system 430 is configured to determine, based the characteristic (e.g., the presence or absence of the characteristic, the intensity of the characteristic, the type of the characteristic, etc.) whether the refuse can is located at the pickup location. The vehicle detection system 430 may include an object detector including a neural network or other similar model for processing received data (e.g., from sensors 126, from the vision system 128, etc.) to detect target objects. In some embodiments, the vehicle detection system 430 is configured to perform object recognition on the data to verify whether the refuse can is located at the pickup location. By way of example, the vehicle detection system 430 may use an artificial intelligence model (e.g., convolutional neural network, etc.) trained on a dataset of known refuse can image data (e.g., known contours, edges, shapes, textures, colors of an asset) to perform the object recognition. The vehicle detection system 430 may compare characteristics (e.g., visual features) from the data acquired from the sensors 126 and/or the vision system 128 such as contours, edges, shapes, textures, colors, etc. against the features of the known refuse can image data to recognize the object (e.g., recognize the refuse can). In some embodiments, the vehicle detection system 430 is configured to process the data acquired from the sensors 126 and/or the vision system 128 using one or more other techniques (e.g., pose estimation, depth sensing, occlusion handling, etc.) to verify whether the refuse can is located at the pickup location. The vehicle detection system 430 may be post-processed (e.g., during training) by implementing automated augmentation and/or stochastic regularization to renormalize newer versions of the vehicle detection system 430 that have been trained using new data. Automated augmentation may include, for example, automatically augmenting image data to produce slightly varied versions of the image data to retrain and improve the vehicle detection system 430. Said post-processing techniques may improve the performance of the vehicle detection system 430, for example, by reducing overfitting of the vehicle detection system 430.

The model implemented by the vehicle detection system 430 may be trained by any number of methods. By way of example, the vehicle detection system 430 may be trained during manufacture or prior to implementation. In some embodiments, initial training of the vehicle detection system 430 may be handled by a remote system (e.g., a server or computer), and a trained instance of the vehicle detection system 430 may be implemented via controller 102. Similarly, the vehicle detection system 430 may be updated or replaced by receiving updated object model data and/or a new version of the vehicle detection system 430 via an over-the-air (OTA) update from a remote system via the network 415. By way of example, a new version of the vehicle detection system 430 may be trained on a remote server system and uploaded (i.e., transmitted) to the controller 102 via the network 415. In this manner, the vehicle detection system 430 may be continuously improved to provide improved object detection.

In some embodiments, the refuse cans storing refuse to be collected by the refuse vehicle 10 include a barcode and/or a QR code located on one or more outer surfaces of the refuse can. The barcode may be positioned on the refuse can in a location where the sensors 126 and/or the vision system 128 can scan the barcode and/or the QR code. In such embodiments, the characteristic configured to be detected by the sensors 126 and/or the vision system 128 includes the barcode and/or the QR code. By way of example, the vehicle detection system 430 may use the sensors 126 and/or the vision system 128 to scan (e.g., search, track, record, monitor, etc.) the surrounding area of a stop (e.g., the pickup location) for the barcode. If the vehicle detection system 430 does not receive an indication from the sensors 126 and/or the vision system 128 relating to the presence of a barcode at a stop, the vehicle detection system 430 transmits a signal to the controller 102 indicating the absence of the refuse can at that stop. The controller 102 may then transmit the signal to other refuse vehicles 10, the user device 405, the service manager 410, and/or the network 415 associated with an indication that the refuse can was not detected (e.g., missing).

In some embodiments, the refuse cans storing refuse to be collected by the refuse vehicle 10 include a Radio Frequency Identification ("RFID"), Bluetooth enabled tag, or some other tracking tag coupled to the refuse can and configured to transmit signals to the sensors 126 and/or the vision system 128 (e.g., communication with the refuse vehicle 10). The tracking tag may be positioned on the refuse can in a location where the sensors 126 can detect or otherwise scan the tracking tag. In such embodiments, the characteristic configured to be detected by the sensors 126 and/or the vision system 128 includes the tracking tag. By way of example, the vehicle detection system 430 may use the sensors 126 and/or the vision system 128 to scan (e.g., search, track, record, monitor, etc.) the surrounding area of a stop (e.g., the pickup location) for an RFID tag. If the vehicle detection system 430 does not receive an indication from the sensors 126 and/or the vision system 128 relating to the presence of the RFID tag at a stop, the vehicle detection system 430 transmits a signal to the controller 102 indicating the absence of the refuse can at that stop. The controller 102 may then transmit the signal to other refuse vehicles 10, the user device 405, the service manager 410, and/or the network 415 associated with an indication that the refuse can was not detected (e.g. missing).

Based on the data captured by the vehicle detection system 430, the HMI 130 may present a generated user interface. The user interface may include data captured by the sensors 126 and/or the vision system 128 (e.g., live, delayed, or previously captured image data) and an indication of any detected objects (e.g., refuse cans) within the data and an indication of any absent refuse cans within the data. As an example, the user interface may present an image of the route 308 that refuse vehicle 10 is traveling on, and may indicate one or more detected refuse cans and one or more absent refuse cans located along the route 308. An example user interface is described in detail below, with respect to FIG. 8.

Figure 8:
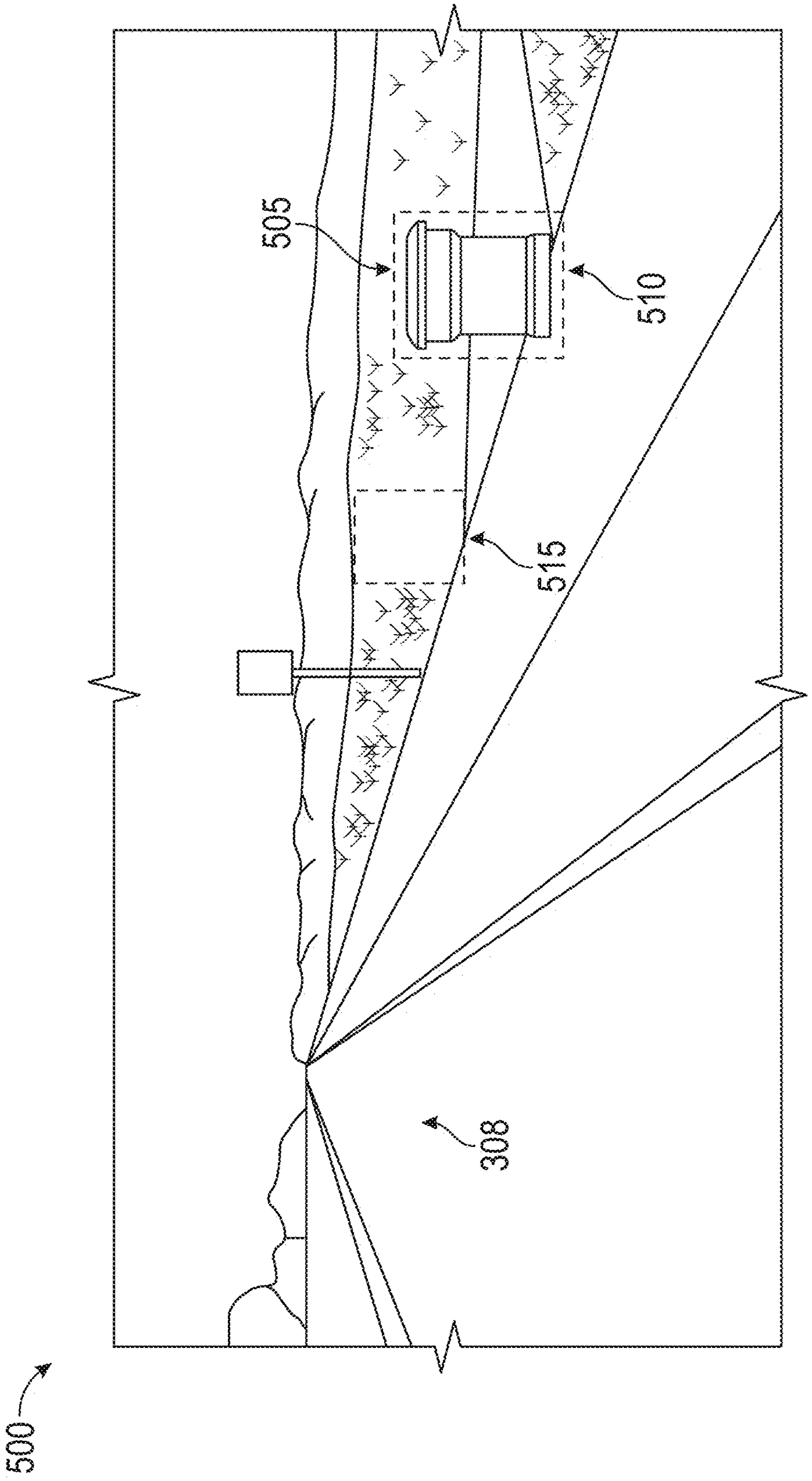
FIG. 8 is an example interface illustrating the detection of the absence and presence of a refuse can, according to an exemplary embodiment.

Referring to FIG. 8, an example interface 500 illustrating the detection and absence of multiple refuse cans is shown, according to some embodiments. The interface 500 may illustrate an example of a user interface presented to a user of the controller 102 and/or the refuse vehicle 10. The interface 500 may be presented via HMI 130, for example. More generally, the interface 500 illustrates the detection of refuse can objects from data captured by one or more image and/or object sensors. In some embodiments, the interface 500 includes an example of an interface presented based on process 700 described in detail below.

In some embodiments, the image of the interface 500 represents an input image to the vehicle detection system 430. The vehicle detection system 430 may be configured to detect any number of object classes, as described above, including at least refuse cans. As shown, a first refuse can 505 located at a first pickup location 510 (e.g., a stop along the route 308) has been detected (e.g., by the vehicle detection system 430). A second pickup location 515 (e.g., a stop along the route 308) is shown having been detected (e.g., by the vehicle detection system 430) without a refuse can positioned at the second pickup location 515. The first refuse can 505 is shown with a bounding box, indicating the first refuse can 505 within interface 500 and a probability that the bounding box actually contains the detected first refuse can 505. The bounding box for the first refuse can 505 may not only indicate detected objects, but may indicate a location (e.g., first pickup location 510) of the first refuse can 505 within a captured image (e.g., the image presented in interface 500.). A second bounding box is shown indicating a location of the second pickup location 515 where the refuse vehicle 10 and/or the vehicle detection system 430 expect a refuse can to be. The expectation of the refuse can to be placed at the second pickup location 515 may be based on data previously gathered by the vehicle detection system 430, an indication received from the service manager 410 that a customer has subscribed to the refuse collection service, a particular day of the week when the second pickup location 515 is scheduled for refuse pickup, a request to pickup refuse received from a customer, etc.

The first refuse can 505 may be associated with a confidence value (e.g., 0.999, 0.990, etc.). By way of example, based on the data acquired by the sensors 126 and/or the vision system 128, the vehicle detection system 430 may calculate the confidence value associated with a bounding box (e.g., a bounding box established around a pickup location, an expected pickup location, etc.). The confidence value may indicate a level of confidence that the associated bounding box actually contains an object (e.g., a refuse can). As described above, objects with a confidence value below a threshold may be ignored. By way of example, when the vehicle detection system 430 detects a pickup location and determines the pickup location has a confidence value lower than the threshold, the vehicle detection system 430 can make a determination that the refuse can is absent from the pickup location. In some embodiments, the vehicle detection system 430 transmits a signal associated with a confidence value of a pickup location to the controller 102. In such embodiments, the controller 102 is configured to receive the confidence value and make a determination whether the refuse can is absent from the pickup location.

As shown in FIG. 8, a refuse can is absent from the second pickup location 515. In response to detecting an absence of a refuse can (e.g., if the vehicle detection system 430 does not sense an object such as the refuse can, an RFID tag associated with the refuse can, a scannable code such as a barcode or a QR code associated with the refuse can, etc.) at a location where a refuse can is expected, the vehicle detection system 430 may send input data (e.g., a signal, a video file, an image file, GPS coordinates, etc.) to other refuse vehicles 10, the user device 405, the service manager 410, and/or the network 415 associated with an indication that a refuse can was not detected (e.g., missing). The input data transmitted to other refuse vehicles 10, the user device 405, the service manager 410, and/or the network 415 associated with an indication that a refuse can was not detected may be an image/video file captured by the vision system 128. The vision system 128 may capture image/video data that contains enough of the surrounding area to confirm a location (e.g., customer address, geographical landmarks, street signs, road markings, etc.) of where the missing refuse can was detected. In some embodiments, the vision system 128 is constantly recording, transmitting, and saving image/video data while the refuse vehicle 10 is traveling along the route 308. In other embodiments, the vision system 128 only records, transmits, and saves image/video data when the vehicle detection system 430 detects an absence of a refuse can (e.g., similar to how a vehicle dash cam saves data during an event such as a car accident).

The vehicle detection system 430 may include a storage database, a data logger, or the like that stores any data points (e.g., data from the sensors 126, data from the vision system 128, etc.) received from the vehicle detection system 430. The storage database may include a plurality of telemetry datasets, with each dataset corresponding to a different sensor 126 and/or device of the vision system 128 of the vehicle detection system 430. Each dataset may include a plurality of entries, with each entry including a sensor data point value and a time stamp. Alternatively or additionally, the storage database may store vehicle system reports generated via the vehicle detection system 430. The data captured by the vehicle detection system 430 may be transmitted to other refuse vehicles 10, the user device 405, the service manager 410, and/or the network 415 to share locations (e.g., stops) that were skipped by the refuse vehicle 10 along its route 308 because the vehicle detection system 430 did not detect a refuse can.

The stored data may be removed from the storage database once the data is uploaded to a remote cloud storage. By way of example, long-term storage of the telemetry data and other data may be done on a centralized server, and the network interface 420 may wirelessly connect with a remote server to transmit and store the data. The data includes a timestamp, a vehicle identifier, and a GPS signal from the GPS system 124 to identify the data in remote server. In some embodiments, the service manager 410 can perform similarly functionality to a remote server.

In some embodiments, the service manager 410 can perform similar functionality to the data collection system 425 and/or the vehicle detection system 430. By way of example, the data collected by the vehicle detection system 430 can be provided to the service manager 410. The service manager 410 can use the data to determine whether a refuse can is present or absent at a pickup location or stop along the route 308.

Figure 9:
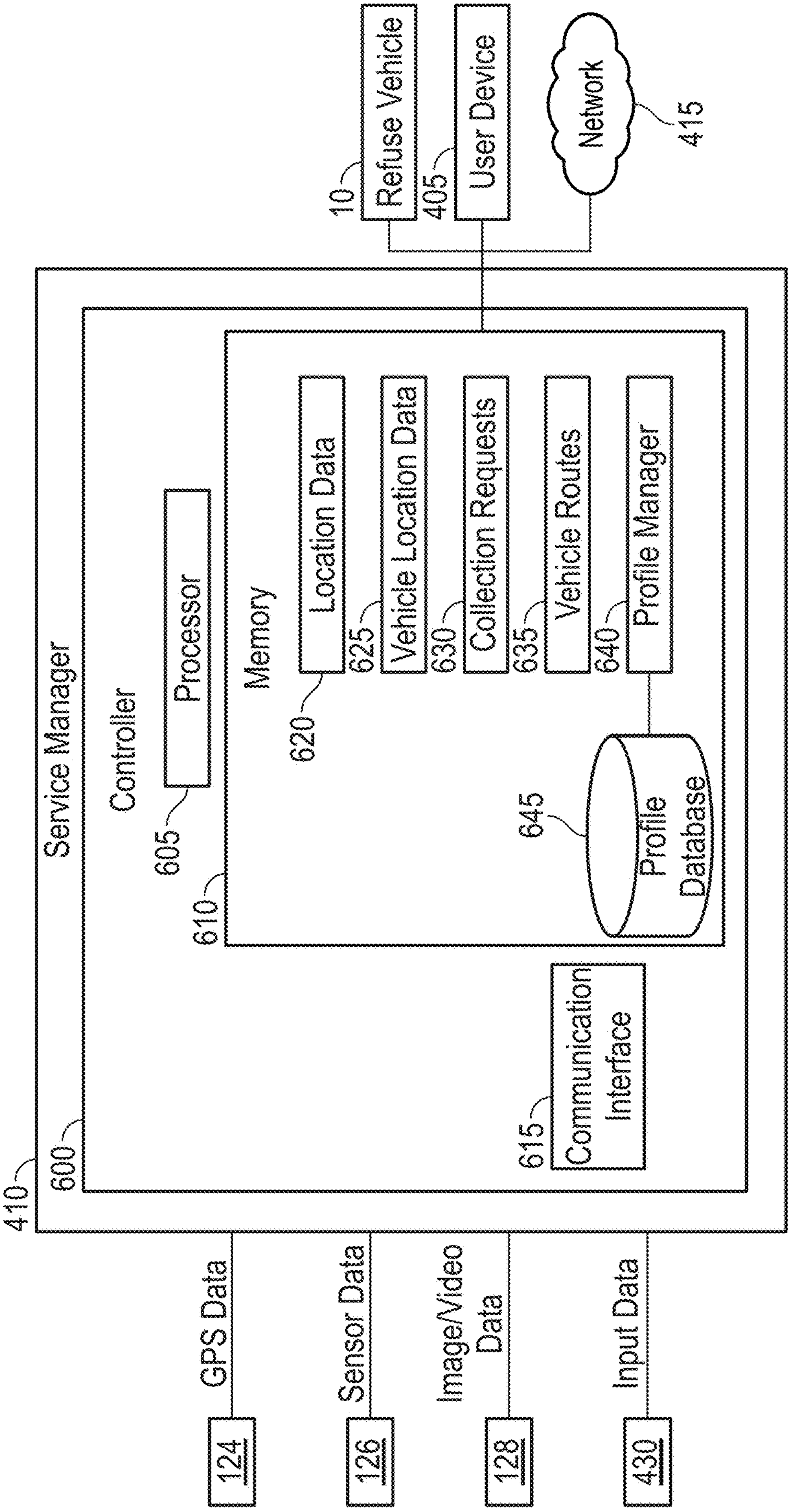
FIG. 9 is a block diagram of a controller of the refuse can detection system of FIG. 6, according to an exemplary embodiment.

Referring to FIG. 9, the service manager 410 is shown according to an exemplary embodiment. The service manager 410 includes a controller 600 that controls operation of the service manager 410. The controller 600 includes a processing circuit, shown as processor 605, and a memory device, shown as memory 610. The memory 610 may contain one or more instructions that, when executed by the processor 605, cause the controller 600 to perform the processes described herein. While some processes may be described as being performed by the controller 600, it should be understood that those processes may be performed by any other controller of the refuse vehicle 10 and/or the system 400 or distributed across multiple controllers of the refuse vehicle 10 and/or the system 400.

The service manager 410 further includes a network interface, shown as communication interface 615, operatively coupled to the controller 600. The communication interface 615 is configured to transfer data between the service manager 410 and other components of the system 400 (e.g., the refuse vehicle 10, the user device 405, the network 415, etc.). The communication interface 615 may facilitate wired and/or wireless communication.

The service manager 410 may receive various inputs (e.g., input data) and provide various outputs (e.g., output data) throughout operation. Specifically, the data is transferred between the service manager 410 and the other components of the system 400 through the communication interface 615. The data may be stored (e.g., temporarily or permanently) in the memory 610. The data may be transferred to other components of the system 400 or analyzed by the controller 600. By way of example, the service manager 410 may utilize multiple sources of data to generate new data that is utilized by the system 400. In some embodiments, the service manager 410 has greater processing capabilities than the other controllers of the system 400. Accordingly, it may be advantageous for certain complex calculations to be performed by the service manager 410. In some embodiments, the service manager 410 utilizes advanced calculation techniques, such as artificial intelligence, machine learning, neural networks, etc. The service manager 410 may utilize this enhanced processing ability along with all of the data available within the system 400 to continuously optimize operation of the system 400 (e.g., minimizing customer wait times and energy usage, etc.).

The various input data received by the memory 610 may include data gathered and processed by the vehicle detection system 430. The data received and processed by the vehicle detection system 430 may include any type of data as described above with respect to the vision system 128, including video from which images and/or other image data can be extracted. As described above, the data may also include data from one or more sensors 126 that may be utilized to detect the presence and absence of an object (e.g., a refuse can) and/or a location or position of the object.

The memory 610 stores location data 620 that indicates a location of one or more users (e.g., customers), the location of one or more user devices 405, or the location of one or more stops along the route 308 where the vehicle detection system 430 detected an absence of a refuse can. The location data 620 may be generated by a location sensor of a user device 405. By way of example, when the vehicle detection system 430 detects an absence of a refuse can at a stop, a signal is transmitted to the service manager 410 including an indication of the absent refuse can at the stop along the route 308. The service manager 410 may then link (e.g., associate) the signal with the location of the stop having the absent refuse can and store the data as the location data 620. The location may be a current location of the user device 405, or the location may be GPS coordinates received from the GPS system 124 at the time the vehicle detection system 430 detected an absence of the refuse can.

The service manager 410 may transmit the location data 620 as output data to other refuse vehicles 10 to display (e.g., via the HMI 130) or otherwise notify an operator of the refuse vehicle 10 of the location of the stop associated with the indication of the absent refuse can. The notification may provide instructions to the operator to instructing them to drive along the route 308 at a later time and stop at the past stop 316 associated with the indication of the absent refuse can to determine if the customer has placed their refuse can in a pickup location. In some embodiments, the HMI 130 of the user device 405 displays a map including a visual representation of a location of the stop where the absent refuse can was detected.

The memory 610 stores vehicle location data 625 that indicates the location of one or more refuse vehicles 10. The vehicle location data 625 may be generated by the GPS system 124 of a refuse vehicle 10 and periodically transferred to the service manager 410. The vehicle location data 625 may provide a real-time or periodic view into the current locations of the refuse vehicles 10. The vehicle location data 625 may facilitate navigation of the refuse vehicles 10 and determining which of the refuse vehicles 10 to assign to a particular route. The vehicle location data 625 may facilitate determining which of the refuse vehicles 10 to transmit instructions to drive past a past stop 316 where the vehicle detection system 430 previously detected an absent refuse can. By way of example, when the vehicle detection system 430 of a first refuse vehicle 10 detects an absent refuse can at a respective location, a signal indicative of the absent refuse can and the respective location may be sent to a second refuse vehicle 10 that is closest to the respective location (e.g., based on the vehicle location data 625) such that the second vehicle 10 can drive by the respective location to determine whether the refuse can was placed in the pickup location (e.g., placed at the respective location). The vehicle location data 625 may provide an indication relating to the number of instances a refuse vehicle 10 has driven past a stop.

The memory 610 may store refuse collection requests 630 from customers. The refuse collection requests 630 may originate in the user devices 405. The refuse collection requests 630 may indicate an identity of the customer requesting the refuse collection, a desired location for the refuse collection (e.g., a location of a future stop 314 or a past stop 316), a desired timing of the refuse collection, a desired type or amount of refuse to be collected, or other information regarding the refuse collection. By way of example, the user device 405 may monitor the location of the customer through a location sensor, and set the current location of the customer as the future stop 314.

In some embodiments, user device 405 runs an application (e.g., a refuse collection hailing application) that facilitates generation of the refuse collection requests 630 by a customer. The application may be stored within a memory of the user device 405. The application may control a display of the user device 405 to provide a graphical user interface (GUI) that communicates information to the customer and/or receives commands from the customer. By way of example, the customer may interact with elements of the GUI through a touch screen of the user device 405 to generate and/or modify the refuse collection request 630.

The service manager 410 may generate path data or navigation instructions, shown as refuse vehicle routes 635 (e.g., route 308), for the refuse vehicles 10 to use to navigate between stops (e.g., future stops 314, past stops 316, pickup locations, etc.), neighborhoods 302, and/or landfills 304. A refuse vehicle route 635 may include a fully formed path (e.g., turn-by-turn directions) for the refuse vehicle 10 to follow. Alternatively, a refuse vehicle route 635 may include a request for a refuse vehicle 10 to arrive at a particular stop (e.g., future stop 314, past stop 316, pickup location, etc.), neighborhood 302, and/or landfill 304. The refuse vehicle routes 635 may include instructions that are followed by an operator of the refuse vehicle 10. Alternatively, the refuse vehicle routes 635 may include instructions that are followed by an autonomous control system of the refuse vehicle 10.

The memory 610 may store a profile manager 640 configured to receive GPS data (e.g., GPS coordinates from the GPS system 124), sensor data (e.g., LIDAR data, radar data, etc.) from the sensors 126, image/video data (e.g., pictures, videos, audio files, etc.) from the vision system 128, and input data (e.g., a signal relating to a detection that a refuse can is absent from at a pickup location) from the vehicle detection system 430. The profile manager 640 is configured to use the GPS data, the sensor data, the image/video data, and the input data separately or in combination to determine profiles for a pickup location (e.g., a stop). The profile manager 640 may generate the profile including an identification of whether a refuse can is present or absent, a location of the present or absent refuse cans, and their relative distances from the refuse vehicle 10 or positions at the pickup location. The profile manager 640 is configured to provide the profile to a profile database 645 for retrieval by the refuse vehicle 10 (e.g., a controller of the refuse vehicle 10), other refuse vehicles 10 when at the location (e.g., the pickup location, a stop, a customer site, etc.), user devices 405, the service manager 410, and/or the network 415. In some embodiments, a location is determined by the profile manager 640 automatically when GPS data, the sensor data, the image/video data, and input data are first obtained at a pickup location (e.g., a stop) indicating that a refuse can is absent. The locations (e.g., stops where the refuse can is absent) may also be defined and set up by an operator when the vehicle detection system 430 provides an indication to the HMI 130 to display a notification notifying the operator of an absent refuse can. By way of example, the operator may place a pin on a map displayed by the HMI 130 at a location where an absent refuse can was detected.

The service manager 410 may provide output data to the refuse vehicle 10, other refuse vehicles 10 in a fleet of vehicles or in the surrounding area, the user device 405, and/or the network 415. The output data may relate to an identification of one or more particular pickup locations that were detected to have an absent refuse can. In some embodiments, the output data may be a signal commanding one or more refuse vehicles 10 to revisit a location that was detected to have an absent refuse can. In other embodiments, the output data is transmitted to the user device 405 of a customer notifying the customer that a refuse can was not detected at a pickup location associated with the customer, and therefore their residence was intentionally skipped. In other embodiments, the output data is transmitted to the network 415 to be uploaded to a remote cloud storage. In such embodiments, a user may filter through the output data manually to determine pickup locations where a refuse can was not detected and dispatch a refuse vehicle 10 to stop at that location at a future time to determine if the customer has placed the refuse can in the pickup location.

Figure 10:
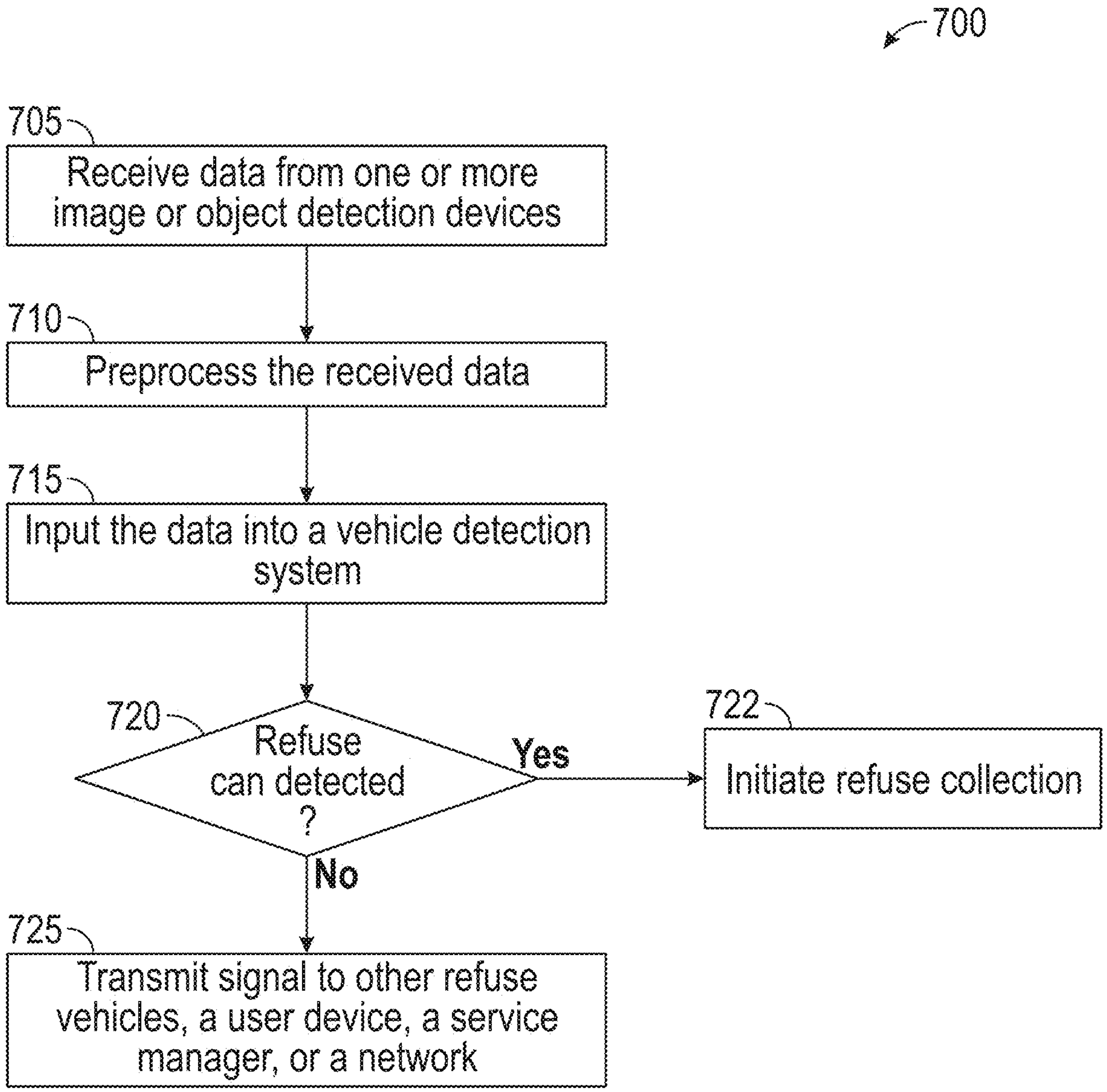
FIG. 10 is a process for initiating a response to transmit a signal based on a determination of an absent refuse can, according to an exemplary embodiment.

Referring now to FIG. 10, a process 700 for detecting a refuse can from captured image and/or object data is shown, according to some embodiments. The process 700 may be a process implemented by a controller of a refuse vehicle (e.g., refuse vehicle 10) for detecting one or more refuse cans from data captured by sensors (e.g., sensors 126) or image devices (e.g., vision system 128) disposed at various locations of the refuse vehicle. The process 700 may be implemented by controller 102 and/or controller 600, as described above, for example.

At step 705 data is received from one or more image and/or object detection devices (e.g., sensors 126, vision system 128, etc.) disposed at various locations of a refuse vehicle. In some embodiments, data is received from at least a visible light camera and a LIDAR camera or sensor. Received data may include raw data from one or more cameras (e.g., visible light cameras) and/or data from one or more sensors (e.g., LIDAR, radar, etc.), as described above. In various embodiments, the data includes still images, video, or other data that can be used to detect a refuse can and a designated pickup location of the refuse can. In some embodiments, the received data includes at least raw image data and LIDAR data. The data may be captured from one or more sides of a refuse vehicle, in order to detect refuse cans and/or pickup locations on either side of a roadway or path that the refuse vehicle traverses.

At step 710, the raw data received from the one or more sensors is preprocessed. It will be appreciated that step 710 may be an optional step in some implementations, where preprocessing is necessary or desired. In other implementations, it may not be necessary or desirable to preprocess the data. Accordingly, in some embodiments, preprocessing of data may be implemented prior to processing the data to detect objects such as refuse cans. In various embodiments, data may be preprocessed by an imaging device before being transmitted to a controller for image detection, or may be preprocessed by a first system (e.g., a controller, a computer, a server, a GPU, etc.) prior to being received by a second system (e.g., controller 600 and/or vehicle detection system 430) for object (e.g., refuse can) and pickup location detection.

In some embodiments, preprocessing the data may include any number of functions based on a particular implementation. By way of example, preprocessing for a one-stage object detector such as vehicle detection system 430 may include determining and/or modifying the aspect ratio and/or scaling of received image data, determining or calculating the mean and/or standard deviation of the image data, normalizing the image data, reducing dimensionality (e.g., converting to grey-scale) of the image data, etc. In some embodiments, preprocessing may include determining and/or modifying the image data to ensure that the image data has appropriate object segmentation for utilizing during training (e.g., of the vehicle detection system 430) and/or object/location detection. In some embodiments, preprocessing may include extracting or determining particular frames of video for further processing.

At step 715, the data is input into a vehicle detection system, such as vehicle detection system 430 as described above. The vehicle detection system may process the data to detect one or more target objects or areas (e.g., refuse can, a pickup location, etc.). The output of the vehicle detection system include an indication of target objects, such as one or more refuse cans, an indication of target areas, such as one or more pickup locations, and an indication of a confidence value for the detected objects and areas. As an example, the indication of the target objects may include a class of the object (e.g., "refuse can", etc.) and a confidence value that a bounding box (e.g., shown in FIG. 8) associated with the detected object actually contains the object. Similarly, by way of example, the indication of the target area may include a class of the area (e.g., "pickup location", etc.) and a confidence value that a bounding box associated with the detected area contains a refuse cand.

At step 720, a determination is made based on the whether or not a refuse can (e.g., or multiple refuse cans) are detected based on the data. In some embodiments, the determination is based on the confidence value associated with a detected object (e.g., associated with a bounding box for the detected object, as shown in FIG. 8). In some embodiments, a confidence value at or greater than a threshold value may indicated a determination that an object (e.g., a refuse can) is detected. A confidence value below the threshold value may indicate a determination that a refuse can is not detected. If a refuse can is detected, the process 700 may continue to step 722. If no refuse can is detected, however, the process 700 may continue to step 725.

At step 722, when a refuse can is detected, the refuse vehicle initiates automatic or manual protocols to collect the refuse from the refuse can. The protocol may include a number of automatic actions such as operating a lift assembly (e.g., lift assembly 40) to engage the refuse can. The refuse vehicle may also initiate an ejection procedure to dump the refuse stored in a refuse compartment (e.g., refuse compartment 30) at a landfill (e.g., landfill 304).

At step 725, when a refuse can is not detected, a signal is transmitted to other refuse vehicles, a user device (e.g., user device 405), a service manager (e.g., service manager 410), and/or a network (e.g., network 415) relating to an indication that the refuse can was not detected at a particular location. In response to receiving the signal, a response may be initiated. The response may include any number of automated control actions. By way of example, the response may include presenting a notification or indication of the absent refuse can to an operator via a user interface (e.g., HMI 130, user device 405, etc.). In this example, the operator may be provided with instructions to navigate the refuse vehicle back to the location where in absent refuse can was detected, at which point the process 700 may continue back to step 705 where the process of capturing and processing data is repeated.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A system for detecting a refuse can, the system comprising:

at least one sensor; and one or more processing circuits communicably coupled to the at least one sensor, the one or more processing circuits configured to:

capture, from the at least one sensor, data regarding a pickup location associated with a refuse can;

determine, based on the data, if the refuse can is present at the pickup location;

upon determining that the refuse can is absent from the pickup location, generate a first indication that the refuse can is absent from the pickup location and a second indication that the refuse can is absent from the pickup location, the second indication different from the first indication;

provide the first indication to a first operator of a first refuse vehicle and the second indication to a second operator of a second refuse vehicle; and upon determining that the refuse can is present at the pickup location, generate a command to initiate a refuse collection operation.

2. The system of claim 1, wherein the at least one sensor is coupled to the first refuse vehicle and configured to capture data on one or more sides of the first refuse vehicle.

3. The system of claim 2, wherein the at least one sensor includes at least one of a visible light camera, a LIDAR camera, or a radar sensor.

4. The system of claim 2, wherein the one or more processing circuits includes at least one of (i) a first processing circuit located on the first refuse vehicle or (ii) a second processing circuit located remote from the first refuse vehicle.

5. The system of claim 1, wherein the one or more processing circuits are configured to share at least one of the first indication or the second indication with at least one of a user device, a service manager, or a network.

6. The system of claim 5, wherein the one or more processing circuits are configured to receive the pickup location from the user device responsive to a user providing an input associated with the pickup location to the user device.

7. The system of claim 1, wherein the one or more processing circuits are configured to determine if the refuse can is present at the pickup location based on a detection of a characteristic or an absence of the characteristic in the data.

8. The system of claim 7, wherein the characteristic includes at least one of a contour, edge, shape, texture, or color of the refuse can, and wherein the one or more processing circuits are configured to perform object recognition to determine if the refuse can is present at the pickup location.

9. The system of claim 7, wherein the characteristic includes at least one of a barcode, a QR code, or a tracking tag.

10. The system of claim 1, wherein the one or more processing circuits are configured to:

calculate, based on the data, a confidence value associated with the pickup location, the confidence value being indicative of whether the refuse can is present at the pickup location;

compare the confidence value with a threshold confidence value; and upon determining that the confidence value is greater than the threshold confidence value, determine that the refuse can is present at the pickup location.

11. The system of claim 1, wherein upon determining that the refuse can is absent from the pickup location, the one or more processing circuits are configured to capture and store data including the pickup location to verify that the refuse can is absent from the pickup location.

12. The system of claim 1, wherein the one or more processing circuits are configured to provide the first indication for display on a first display of the first refuse vehicle and provide the second indication for display on a second display of the second refuse vehicle.

13. The system of claim 12, wherein at least one of the first indication or the second indication includes a bounding box indicating the pickup location where the one or more processing circuits expect the refuse can to be upon determining that the refuse can is absent from the pickup location.

14. The system of claim 1, further comprising an actuator assembly configured to engage with the refuse can and to move the refuse can, and wherein the refuse collection operation includes actuating, in response to the one or more processing circuits generating the command, the actuator assembly to engage and move the refuse can.

15. A refuse vehicle comprising:

a chassis coupled to a plurality of tractive elements;

a body assembly supported by the chassis, the body assembly defining a refuse compartment configured to receive refuse therein;

an actuator assembly configured to engage with a refuse can and to move the refuse can relative to the body assembly;

a sensor coupled to at least one of the chassis, the body assembly, or the actuator assembly; and a control system configured to:

capture, from the sensor, data regarding a pickup location associated with the refuse can;

determine, based on the data, if the refuse can is present at the pickup location;

upon determining that the refuse can is absent from the pickup location, generate a first indication that the refuse can is absent from the pickup location and a second indication that the refuse can is absent from the pickup location, the first indication different from the second indication;

provide the first indication to a first operator of the refuse vehicle and the second indication to a second operator of a second refuse vehicle; and upon determining that the refuse can is present at the pickup location, initiate, by the actuator assembly, a refuse collection operation.

16. The refuse vehicle of claim 15, wherein the control system is configured to determine if the refuse can is present at the pickup location based on a detection of a characteristic or an absence of the characteristic in the data, wherein the characteristic includes at least one of a contour, edge, shape, texture, color, barcode, QR code, or tracking tag.

17. The refuse vehicle of claim 15, wherein the control system is configured to:

calculate, based on the data, a confidence value associated with the pickup location, the confidence value being indicative of whether the refuse can is present at the pickup location;

compare the confidence value with a threshold confidence value; and upon determining that the confidence value is greater than the threshold confidence value, determine that the refuse can is present at the pickup location.

18. The refuse vehicle of claim 15, wherein upon determining that the refuse can is absent from the pickup location, the control system is configured to capture and store data including the pickup location to verify that the refuse can is absent from the pickup location.

19. The refuse vehicle of claim 15, wherein the control system is configured to provide the first indication for display on a first display of the refuse vehicle and provide the second indication for display on a second display of the second refuse vehicle.

20. A method for detecting a refuse can, the method comprising:

acquiring data of an area surrounding a first refuse vehicle from at least one sensor coupled to the first refuse vehicle, the area including a pickup location associated with a refuse can;

determining, based on the data, if the refuse can is present at the pickup location;

upon determining that the refuse can is absent from the pickup location, generating a first indication that the refuse can is absent from the pickup location and a second indication that the refuse can is absent from the pickup location, the first indication different from the second indication;

providing the first indication to a first operator of the first refuse vehicle and the second indication to a second operator of a second refuse vehicle; and upon determining that the refuse can is present at the pickup location, initiating a refuse collection operation.

* * * * *